Figure 1:
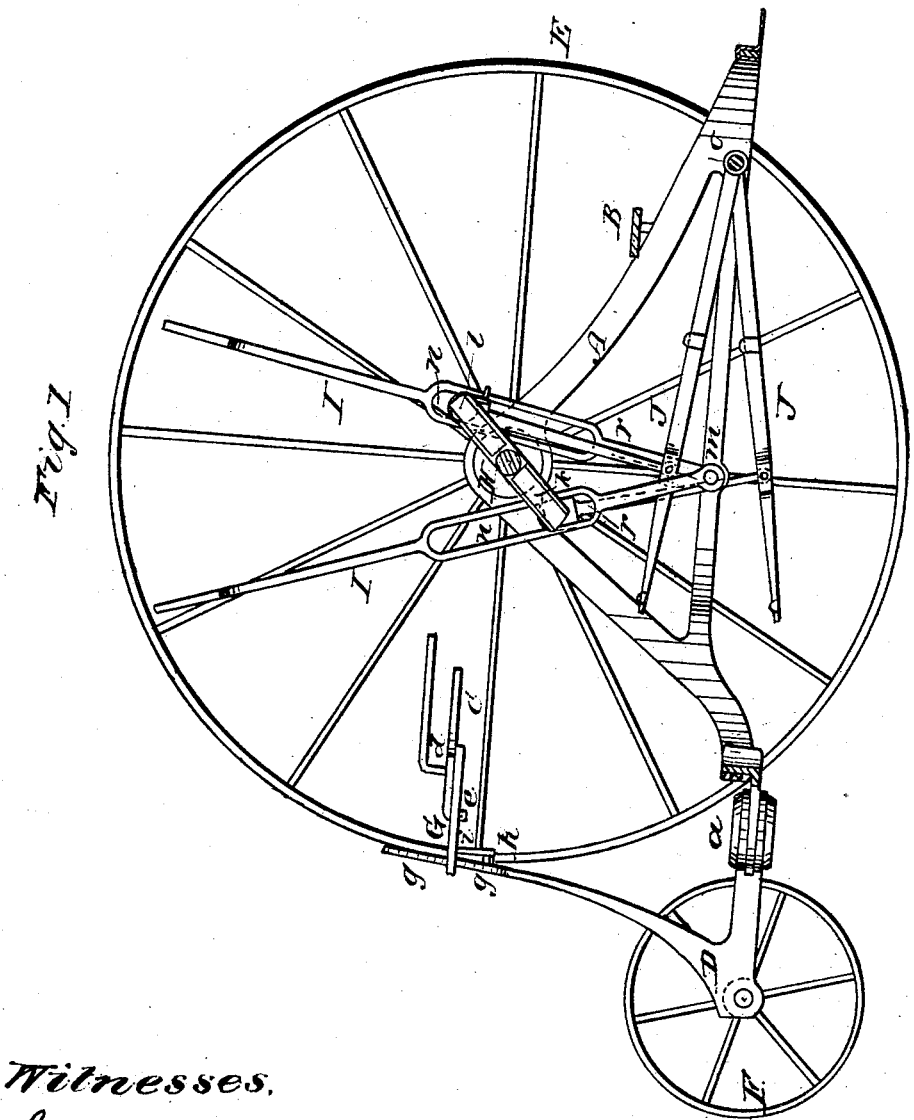

J. REYNOLDS.
Velocipede.

2 Sheets—Sheet 1.

No. 90,579.

Patented May 25, 1869.

Witnesses.
J. W. Coombs
Fred. Haynes

Inventor
James Reynolds

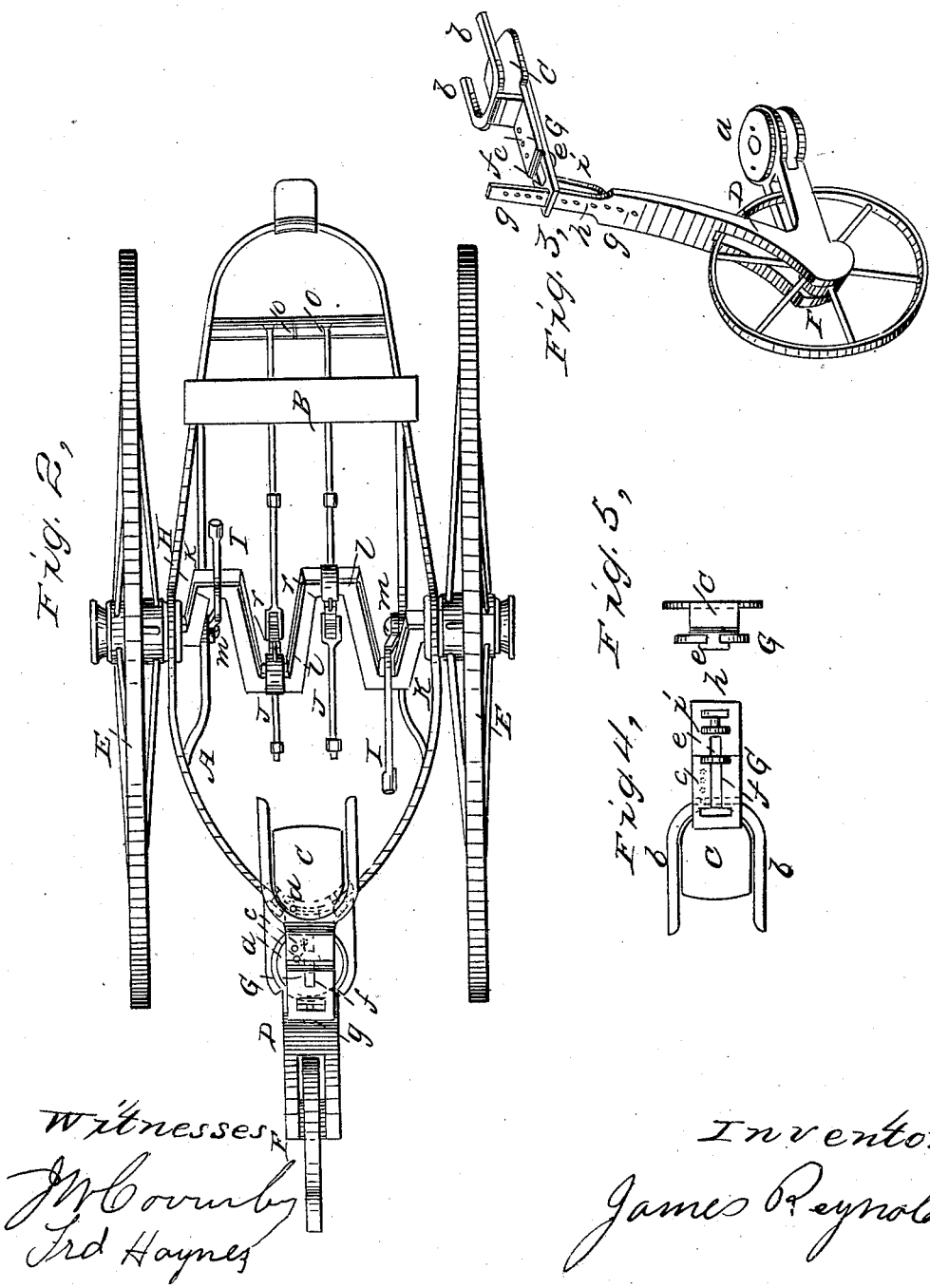

United States Patent Office.

JAMES REYNOLDS, OF BROOKLYN, NEW YORK, ASSIGNOR TO HIMSELF AND JOHN J. MARSHALL, OF NEW YORK CITY.

Letters Patent No. 90,579, dated May 25, 1869.

IMPROVEMENT IN VELOCIPEDE.

The Schedule referred to in these Letters Patent and making part of the same.

*To all whom it may concern:*

Be it known that I, JAMES REYNOLDS, of Brooklyn, in the county of Kings, and State of New York, have invented a new and useful Improvement in Velocipedes, of which the following is a full, clear, and exact description, reference being had to the accompanying drawing, forming part of this specification, and in which—

Figure 1 represents a side view of a velocipede constructed in accordance with my improvement;

Figure 2, a plan of the same;

Figure 3, a view, in perspective, of the steering-wheel, with its attachments, including an adjustable seat for the operator;

Figure 4, an inverted plan of said adjustable seat; and

Figure 5, a transverse section thereof, through the line $x\ x$ in fig. 4.

Similar letters of reference indicate corresponding parts.

My improvement relates more especially to "three-wheel" velocipedes, having driving-wheels on opposite sides of its main frame, and a centre steering-wheel in the rear, the spring power being applied through both hand-levers and treadles to the axle of the driving-wheels; and The invention consists in certain combinations or arrangements and peculiarities in construction of the parts, including a secondary frame, pivoted in the rear to the main frame, in combination with a seat carried by the same, and preferably made adjustable in various directions; also, a certain arrangement of the cranks, levers, and treadles, as will be found hereinafter described.

Referring to the accompanying drawing—

A represents the main frame of the vehicle, which is provided with a front seat, B, and rear seat C, the one, B, being arranged on the main frame, and the other, C, on or connected with a rear frame, D, pivoted, as at $a$, to the main frame.

E E are the driving, or main running-wheels, and F the steering-wheel.

This latter wheel F is carried by the rear frame, which also has connected with it the operator's seat C, that is arranged to occupy a leverage position in relation to the main frame or its pivot $a$, so that the operator, by pressing with his body to either side of the seat, swings the rear frame, and thus suitably turns or directs the steering-wheel.

To effect this, and to provide for certain adjustments of the seat up or down, and backward or forward, for the greater convenience of the operator, the seat C is shown as formed of a plate or board, with side arms $b\ b$ and holes $c$ along its one side, which latter fit a pin, $d$, projecting from a bracket, or plate G, connected with the rear frame, the seat-plate being guided and sliding by a T-shaped projection, $e$, from it, and slot $f$, in the bracket, along the latter, and secured at any desired position, in a forward or backward direction, by allowing the pin $d$ to enter one or other of the holes $c$.

Said seat C is also adjustable vertically, in a similar manner, by providing the rear end of the bracket G with a slot, so as to admit of its being slid up or down the upright portion of the rear frame D, which portion has a number of perforations, $g$, in it, that a pin, $h$, arranged to project from an arm, $i$, of the bracket G, fits or drops into.

It is only necessary to slightly raise the seat C, or forward end of the seat-plate, so as to clear the pin $d$ of the holes $c$, when it is required to effect the forward or backward adjustment of said seat, and to slightly lift the front end of the bracket, so as to clear the pin $h$ of the perforations $g$, when requiring to effect vertical adjustment, the mere lowering of the seat-plate, or bracket afterward, securing the necessary lock of said parts at the adjustment given them.

The main wheels E E may, if desired, be connected with the axle H, either in a permanent manner, and both be made drivers, or so that they may be made to run loose on the axle at times, to facilitate practice of the operating-levers and treadles without propelling the vehicle; or the one wheel may be fast and the other loose, to better adapt the velocipede to turn sharp curves.

The axle H is of a four-throw character, having four cranks, $k\ k$ and $l\ l$, all arranged to lie in the same plane.

Two of these cranks $k\ k$ are operated by hand-levers I I, pivoted, as at $m$, to the main frame, and having slots $n$ in them, through which the wrist-pins of the cranks pass.

The other two cranks $l\ l$ are operated by treadles J J, pivoted as at $o$, and connected with the cranks by pitmen $r\ r$.

By this combination of slotted hand-levers, treadles, and cranks, the latter of which are all arranged in the same plane, a very simple and efficient driving-arrangement is secured, with every facility for starting, as, by the disposition of the hand-levers relatively to the treadles, when two of the cranks are on their dead-centre, the other two are in their most effective positions.

The front seat B is preferably arranged partly over the treadles J J, near their fulcrum, so that if occupied by a female, who may either sit looking forward or facing the operator, she may assist, in a gentle and easy manner, in the working of the treadles.

What is here claimed, and desired to be secured by Letters Patent, is—

1. The arrangement of the seat C on the independent rear frame D, carrying the steering-wheel F, and pivoted, as at a, to the main frame, which carries the driving-wheels E E, substantially as shown and described.

2. The arrangement of the slotted hand-levers I I, and treadles J J, relatively to each other and the cranks k k and l l, substantially as specified.

JAMES REYNOLDS.

Witnesses:
 FRED. HAYNES,
 J. W. COOMBS.